Patented July 29, 1952

2,605,246

UNITED STATES PATENT OFFICE 2,605,246

METHOD OF PREPARING A SOLUTION OF AN ACRYLONITRILE POLYMERIZATION PRODUCT

Arthur Cresswell, Stamford, and Percival W. Cummings, Jr., Cos Cob, Conn., assignors to American Cyanamid Company, New York, N. Y., a corporation of Maine No Drawing. Application April 6, 1951, Serial No. 219,764

13 Claims. (Cl. 260—29.6)

1

This invention relates broadly to a method of preparing a solution of a polymerized vinyl compound, more particularly an acrylonitrile polymerization product. Specifically the invention is concerned with a method of forming a solution of an acrylonitrile polymer comprised mainly of combined acrylonitrile, that is, a preponderant proportion by weight of acrylonitrile combined in the polymer molecule. Briefly described, the new and novel method of our invention comprises dispersing such a polymer, preferably an acrylonitrile polymerization product containing an average of at least 85% by weight of combined acrylonitrile, in water containing a water-soluble salt which yields highly hydrated ions in an aqueous solution, for example a water-soluble thiocyanate and specifically sodium or calcium thiocyanate. The amount of the said salt which is present in the water when the polymer is dispersed therein is less than the critical concentration required in order to form a solution that will dissolve the polymer. To the resulting dispersion is then added an additional amount of the same salt, the amount and concentration thereof being such that, after adding said salt (in solid form or in the form of a concentrated aqueous solution or paste) to said dispersion, the concentration of the said salt in the resulting mixture is above the critical concentration of salt required in order to dissolve the aforementioned polymer therein.

It was known prior to our invention that solutions of various vinyl polymers, including acrylonitrile polymerization products, could be produced by dissolving the vinyl polymer in a concentrated aqueous solution of a water-soluble salt which yields highly hydrated ions in an aqueous solution. Such solutions are described in Rein Patent No. 2,140,921. It also previously was known that clear solutions of an acrylonitrile polymer containing at least 85% by weight of combined acrylonitrile could be produced by commingling such a polymer in a finely divided form with a solvent having marked dissolving power for the polymer at a high temperature while maintaining the polymer in the form of discrete particles, as by cooling the solvent to 0°–15° C., and thereafter heating the mass to a temperature at which the said solvent dissolves the acrylonitrile polymer. Another prior method of producing solutions of an acetone-soluble vinyl resin dissolved in a volatile solvent is described in Patent No. 2,413,758, and involves mixing the finely divided vinyl resin with the solvent while maintaining the resulting mixture at a temperature below that at which rapid solvation of the resin by the solvent occurs. In this way a slurry containing resin particles that have been penetrated, but not dissolved by, the solvent is formed; thereafter, the temperature of the mixture is increased to at least 20° C. while agitating the mixture, as a result of which the solvent capacity of the solvent for the resin is increased and there is produced a resin solution which is substantially free from resin particles.

A method which we previously have used in forming solutions of polymeric or copolymeric acrylonitrile dissolved in a concentrated aqueous solution of a water-soluble thiocyanate, or similar salt of the general class described above, has been to add the dry, pulverized acrylonitrile polymerization product to a chilled (0° C. to –10° C.) solution of the water-soluble salt with such rapid stirring that the polymer or copolymer is quickly dispersed in the form of particles before they begin to swell and dissolve. If this same addition of the acrylonitrile polymerization product is added to the same aqueous solution of the water-soluble salt while the solution is maintained at room temperature or higher, it frequently happens that the polymeric or copolymeric acrylonitrile "balls up" and forms lumps which are slow to dissolve. This has obvious disadvantages including the fact that much longer periods of stirring are required in order to dissolve the acrylonitrile polymerization product. Furthermore, the method necessitates the use of refrigeration in order to reduce the temperature of the aqueous solution of the water-soluble salt, thereby increasing the cost of forming the solution of the polymeric or copolymeric acrylonitrile.

The present invention is based on our discovery that solutions of an acrylonitrile polymer (homopolymer or copolymer or interpolymer) can be readily and economically produced by following the procedure briefly described in the first paragraph of this specification and more fully hereafter. Among the advantages of the invention may be mentioned the following:

1. A higher production capacity is secured from the same equipment generally employed.
2. No refrigeration is required.
3. No special equipment for charging the polymer or copolymer to the dissolving equipment, such as a vibratory feeder, is required.
4. The danger of incomplete solution of the acrylonitrile polymerization product is minimized.
5. The amount of air which is introduced into the solution in the form of bubbles during the process of dissolution is kept to a minimum, thereby aiding and simplifying subsequent deaeration of the solution, and minimizing the action of oxygen on the dissolved polymerization product.
6. The time of mixing in order to dissolve the acrylonitrile polymerization product is very materially reduced, e. g., about one-half as much as that which previously was required.

In practicing our invention, two main steps are involved in producing the solution of the acrylonitrile polymer. The first is the addition of the acrylonitrile polymerization product to an aqueous solution of a water-soluble salt which yields highly hydrated ions in an aqueous solution, the concentration of this salt in the water being insufficient to yield a solution that will dissolve the acrylonitrile polymerization product; and, secondly, the addition of a further amount of the same water-soluble salt, in a suitable form, to the slurry of the polymeric or copolymeric acrylonitrile, using an amount and a concentration of the said salt which is sufficient to form a final solution that will dissolve the acrylonitrile polymerization product. The mixture of acrylonitrile polymer and salt solution is then agitated until substantially complete solution of the former in the latter has been obtained. This method permits the even dispersion of the acrylonitrile polymerization product in a non-solvent therefor, since the amount of the water-soluble salt which is present in the water is less than the critical concentration required to form a solution that will dissolve the acrylonitrile polymer.

The polymerization product may be introduced in any convenient manner to the water containing the lower concentration of the water-soluble salt, no solution of the polymer therein will take place until an additional quantity of the same salt has been added either in the form of a solid or as a concentrated aqueous solution or paste thereof. Consequently, disintegration of the agglomerates is accomplished merely by mechanical means, as by the use of an agitator. This technique eliminates the necessity of using a vibratory feeder or other mechanical means to partially break down agglomerates, or of cooling the liquid medium in order to reduce the rate of solution of the acrylonitrile polymer therein. This means of dispersion insures that agglomerates will not come into contact with solvent for the acrylonitrile polymer; consequently, there is little chance of undissolved polymer being present in the final solution.

Ordinarily agitation for about one hour, after the addition of the concentrated salt (in solid state or in concentrated aqueous solution or paste form) to the slurry of the polymer, gives a solution which is free from undissolved polymer, which is approximately half of the time, or less, heretofore required to dissolve an acrylonitrile polymerization product in a concentrated aqueous solution of the above-described water-soluble salts, even when such a salt solution has been chilled to a low temperature, e. g., −10° C. to +10° C., in order to minimize the formation of agglomerates.

In accordance with the preferred procedure, the solution of the water-soluble salt of lower concentration is deaerated by vacuum prior to the addition of the acrylonitrile polymer thereto, and the polymer is then added to the deaerated salt solution, followed by the application of vacuum for several minutes, before agitation is started. The remainder of the water-soluble salt, preferably in the form of a concentrated aqueous solution of the same, is also preferably added under vacuum so that, by the time solution begins to take place, very little air is left in or above the contents of the vessel in which solution is effected. A high degree of vacuum, for example a vacuum corresponding to 29 inches of mercury, advantageously is maintained on the kettle or mixing device at all times from this point on in the process, thereby rapidly eliminating air. By the time solution of the polymerization product is complete, the solution is nearly clear and contains at most only a very small amount of air finely dispersed throughout, but no foam. The full amount of vacuum that can be applied by the particular system (e. g., 29 inches of mercury vacuum) then may be applied to the solution in the storage tank immediately after filtration of the solution.

The temperature of the mix prior to and during dissolution of the acrylonitrile polymer can be varied considerably, as desired or as conditions may require, for example within the range of 0° C. to 100° C. No particular advantage appears to accrue from the use of temperatures below room temperature, that is, about 20° to 30° C. As has been indicated hereinbefore, the use of such low temperatures has the disadvantage that it requires refrigeration, thereby adding to the cost of the process. With increasing temperatures above room temperature, undesired discoloration of the acrylonitrile polymer in some cases may take place. Hence, when optimum color of the polymer or of fibers produced therefrom is desired, it is preferable to maintain the mix at a temperature within the range of about 20° C. to about 30° or 40° C. Since heat is evolved during dissolution of the polymer, largely as a result of mechanical agitation, it is sometimes desirable to keep the temperature at the desired low point by using a jacketed mixing vessel and passing cooling water through the jacket while the mixture is being stirred to dissolve the polymer.

Discoloration of the polymer or of the solution thereof can be further minimized, if desired, by carrying out the mixing and dissolving operations while maintaining an atmosphere of an inert gas (e. g., nitrogen, carbon dioxide, flue gases, carbon monoxide, helium, argon, etc.) over the surface of the liquid mass so as to obviate or minimize the amount of air which is introduced into the solution.

In accordance with a preferred embodiment of the invention, the acrylonitrile polymer is in moist form (although it may feel relatively dry to the touch) when incorporated into the aqueous solution of the relatively low concentration of water-soluble salt of the kind used in practicing our invention, e. g., a water-soluble thiocyanate, and whereby the polymer is dispersed in the said solution. More particularly it is preferred that the polymer has associated therewith a substantial amount of water, for instance from about 20% to about 50%, by weight of the whole, of water. When the acrylonitrile polymer is in this form, it is more readily dispersed in the salt solution due to the fact that it is more readily wetted by the said solution and, therefore, does not tend to "ball up" or form large agglomerates that require prolonged stirring in order to break them into smaller pieces and wet them effectively. Since moist crumbs or finely divided particles of the acrylonitrile polymer can be used to marked advantage, this has considerable economic benefit due to the fact that it is unnecessary to dry the acrylonitrile polymer produced by polymerization in aqueous solution or emulsion of monomeric acrylonitrile or a mixture of copolymerizable monomers including mainly acrylonitrile, by weight. The acrylonitrile polymerization product is separated from the aqueous phase, as by filtration, centrifuging, etc., the conditions and equipment employed being so adjusted and selected that there is obtained a press cake or centrifuge cake containing the desired amount of water. The cake can be broken up and screened to yield a finely divided material which is adapted to be readily dispersed in the salt solution.

It will be understood, of course, that the use of dry acrylonitrile polymer, or of polymer containing amounts of water up to 20% or more than 50%, is not precluded. However, as has been indicated hereinbefore, when the polymer has associated therewith materially less than 20%, by weight of the whole, of water, there is greater difficulty in forming a uniform dispersion of the polymer in the salt solution in a reasonable length of time; and when the polymer has associated therewith materially more than 50%, by weight of the whole, of water, the amount may cause the dispersion to contain more water than is desired because of the particular concentration of the salt or salt solution or paste later to be added and the particular concentration of salt required in the final solution.

Our invention is applicable to the production of solutions of polymerized vinyl compounds, more particularly polyvinyl compounds of the kind disclosed in the Rein Patent No. 2,140,921, and especially in the formation of solutions of an acrylonitrile polymer comprised mainly (that is, comprised mainly by weight) of acrylonitrile. The polymer or copolymer of acrylonitrile, more particularly homopolymeric acrylonitrile or a thermoplastic copolymer of acrylonitrile, is prepared in accordance with methods now well known to those skilled in the art. In the preparation of copolymers a mixture of monomers comprising mainly, that is, a preponderant proportion by weight of, acrylonitrile is generally employed in order to obtain an acrylonitrile polymerization product or polymer (including a copolymer or interpolymer) comprised mainly, by weight, of acrylonitrile. Usually the monomeric mixture contains substantially more than 50% by weight of acrylonitrile, e. g., from 55 to 99.5% by weight of acrylonitrile. Illustrative examples of monomers which can be copolymerized with acrylonitrile, singly or in combination with one or more other comonomers, to form a copolymer, more particularly a thermo-plastic copolymer, are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, vinyl valerate, vinyl caproate, etc.; acrylic and alkacrylic acids (e. g., methacrylic, ethacrylic, etc.) and esters and amides of such acids (i. g., methyl, ethyl, propyl, butyl, etc., acrylates and methacrylates, acrylamide, methacrylamide, N-methyl, -ethyl, -propyl, -butyl, etc., acrylamides, methacrylamides, etc.); methacrylonitrile and other hydrocarbon-substituted acrylonitriles; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids. Other examples are given in, for instance, Kropa et al. Patent No. 2,534,717.

A suitable method of polymerizing the monomeric acrylonitrile or mixture of monomers is in an aqueous solution or an emulsion using a suitable polymerization catalyst, e. g., ammonium persulfate. Other polymerization methods, however, also may be employed. The polymer or copolymer of acrylonitrile may be of any suitable molecular weight, but ordinarily will be within the range of 15,000 to 300,000 or higher, as calculated from viscosity measurements using the Staudinger equation (reference: U. S. Patent No. 2,404,713).

The water-soluble salts used in practicing our invention are those which yield highly hydrated ions in an aqueous solution, numerous examples of which are given in the aforementioned Rein Patent No. 2,140,921. Such salts include organic salts, as well as inorganic (metallic) salts, e. g., the chlorides, bromides, iodides, thiocyanates, perchlorates and nitrates. More specific examples of such water-soluble inorganic salts are zinc chloride, calcium chloride, lithium chloride, cadmium bromide, cadmium iodide, sodium thiocyanate, zinc thiocyanate, aluminum perchlorate, calcium perchlorate, calcium nitrate, zinc nitrate, etc. Other examples of water-soluble salts that yield highly hydrated ions in an aqueous solution are guanidine thiocyanate, the mono-(lower alkyl)-substituted guanidine thiocyanates and the symmetrical and unsymmetrical di-(lower alkyl)-substituted guanidine thiocyanates. These latter salt solutions containing dissolved polymeric or copolymeric acrylonitrile are more fully described and are specifically claimed in Cresswell Patent No. 2,533,224, issued December 12, 1950.

The term "critical concentration," as used herein and in the appended claims with reference to the concentration of the salt in the water that is required in order to form an aqueous solution that will dissolve the acrylonitrile polymer at the chosen operating temperature, is used in accordance with the ordinary dictionary definitions of the words constituting the term. In other words, it means that concentration below which the acrylonitrile polymerization product is substantially insoluble at the chosen operating temperature and above which it is substantially soluble at that same operating temperature. This concentration obviously varies with the particular salt that is used.

In order that those skilled in the art better may understand how the present invention can be carried into effect, the following examples are given by way of illustration and not by way of limitation. All parts and percentages are by weight.

*Example 1*

One hundred and ninety-four (194) parts of a granulated, wet copolymer cake consisting of 27.7% of water and 72.3% of an acrylonitrile copolymer obtained by copolymerization of 95% acrylonitrile and 5% methyl acrylate was dispersed with rapid stirring into 641 parts of a 43.5% aqueous solution of calcium thiocyanate at about 25° C. (The average molecular weight of the copolymer as determined from viscosity measurements of a dimethyl formamide solution, using the Staudinger equation as described, for example, in U. S. Patent No. 2,404,714, was 77,000.) A homogeneous, thin slurry resulted, the largest particles of copolymer being about the size of a pinhead.

While continuing to stir rapidly, 1165 parts of a 55.9% aqueous solution of calcium thiocyanate was added to the slurry described above. The viscosity soon increased, and the stirring was reduced to a low speed. After stirring for 2 hours at a low speed and at a temperature of about 20° C., solution of the copolymer appeared to be complete.

By the foregoing procedure, the stirring time is very much less and the amount of air in the solution also is much less than when other known techniques for dissolving the acrylonitrile polymerization product in an aqueous solution of a water-soluble salt which yields highly hydrated ions in an aqueous solution, e. g., calcium thiocyanate, are used.

*Example 2*

Example 1 is repeated, but 100% homopolymeric acrylonitrile is used instead of a copolymer of acrylonitrile and methyl acrylate. Similar results are obtained.

*Example 3*

One hundred and ninety-four (194) parts of the same granulated, wet, copolymer cake used in Example 1 was dispersed with rapid stirring in 1010 parts of a 30% aqueous solution of zinc chloride at about 25° C. In this case, too, a homogeneous, thin slurry resulted, the largest particles of the copolymer being about the size of a pinhead.

While continuing to stir rapidly, 796 parts of zinc chloride was added to the above-described slurry. The viscosity soon increased, and the stirring was reduced to a low speed. After agitating by stirring for 1 hour at a low speed, solution of the copolymer appeared to be complete and stirring, therefore, was stopped.

*Example 4*

One hundred and ninety-four (194) parts of the same granulated, wet copolymer cake used in Example 1 was dispersed with rapid stirring in 1196 parts of a 50% aqueous solution of guanidine thiocyanate at about 25° C. As in the previous examples, a thin, homogeneous slurry resulted, the largest particles of the copolymer being about the size of a pinhead.

While continuing to stir rapidly, 610 parts of guanidine thiocyanate was added to the slurry, and the mixture was heated to 40° C. A thin, clear, air-free solution resulted when the mixture reached this temperature. After further stirring at 40° C., the viscosity of the solution increased to the consistency of molasses. There was almost no air in the solution when the copolymer had completely dissolved, and the stirring time was much less than when conventional mixing techniques are used.

*Example 5*

Example 4 is repeated, but 100% homopolymeric acrylonitrile is used instead of a copolymer of acrylonitrile and methyl acrylate. Similar results are obtained.

*Example 6*

Eighty-one hundred (8100) parts of a 57.6% aqueous solution of sodium thiocyanate was charged to a mixing kettle equipped with an agitator capable of 96 R. P. M. (high speed) and 48 R. P. M. (low speed). The solution was agitated at high speed and, while agitating, 3590 parts of water was added. While continuing to agitate at a high speed, vacuum was applied to the kettle. Four minutes after the application of vacuum, agitation was stopped. After allowing the vacuum to remain on the quiet contents of the kettle for another 6 minutes, the vacuum was relieved and 6030 parts of moist acrylonitrile-allyl alcohol copolymer crumb was added without agitation. This moist copolymer crumb comprised about 29.4% of water and about 70.6% of a copolymer obtained by copolymerization of a mixture of about 90% acrylonitrile and 10% allyl alcohol. The average molecular weight of this copolymer, as calculated from viscosity measurements using the Staudinger equation, was about 68,900. Vacuum was applied to the resulting heterogeneous mixture, without agitation, for 6 minutes. Thereafter, high agitation was started and was continued, accompanied by the application of vacuum, for 5 minutes.

To the aqueous slurry of copolymer there was next added 27,300 parts of a 57.6% aqueous solution of sodium thiocyanate over a period of 5 minutes while continuing the agitation and application of vacuum. After the addition of all of the aqueous sodium thiocyanate solution, high-speed agitation and vacuum were continued for another 11 minutes. Agitation was then reduced to a low speed (48 R. P. M. of the agitator), and was continued at this speed, while applying vacuum, for another 50 minutes. A homogeneous solution of the copolymer resulted. This solution, which contained 9% of acrylonitrile-allyl alcohol copolymer, was filtered and then stored under vacuum for 23½ hours in a horizontal cylindrical tank before spinning fibers therefrom.

*Example 7*

Example 6 is repeated, but 100% homopolymeric acrylonitrile is used instead of a copolymer of acrylonitrile and allyl alcohol. Similar results are obtained.

*Example 8*

(a) Sodium thiocyanate stock solution, 57.3 to 57.7%, NaSCN in water.
(b) Water.
(c) Moist acrylonitrile polymerization product, specifically a moist crumb of a copolymer of 95% acrylonitrile and 5% methyl acrylate having an average molecular weight of about 73,000.
(d) Sodium thiocyanate stock solution, 57.3 to 57.7% NaSCN in water.

The (a) composition is charged to the mixing kettle with high-speed agitation followed by (b), which consists of all the water that is to be added as such to the bath. Composition (a) is an amount of aqueous sodium thiocyanate which will give with (b) a 40% solution, a concentration which is insufficient to dissolve the polymerization product. A 29-inch vacuum is applied to the solution while still agitating and after 5 minutes the agitation is stopped, allowing the vacuum to continue for 10 minutes. The vacuum is then broken, and (c) is added in any convenient manner, without agitation. Vacuum is again and then high speed agitation is started. After 2 minutes, (d) is added to the resulting slurry over a period of at least 3 minutes, with vacuum and high agitation still on. Ten minutes from this time, agitation is put on low speed and continued for another 50 minutes. At this time the batch is ready to be filtered and stored in the storage tank where it is deaerated by vacuum preparatory to spinning.

The amount of (d) which is added to the slurry is such as will yield an aqueous sodium thiocyanate composition that will dissolve the acrylonitrile polymerization product, preferably an amount such as will form with the other ingredients a 50% water solution of sodium thiocyanate. The amount of (c) is preferably such as will yield a final solution containing about 9.5% of acrylonitrile polymerization product. When the preferred amounts of (c) and (d) are used, the final spinning solution will then contain about 9.5% of the acrylonitrile polymerization product (when the average molecular weight is about 73,000), and about 45.25% each of sodium thiocyanate and of water. As the molecular weight of the polymerization product is higher or lower, its concentration in the aqueous thiocyanate solution normally will vary somewhat from the above percentage in order to provide a spinning solution of a desired viscosity.

*Example 9*

An aqueous solution of sodium thiocyanate, more particularly 7.57 kg. of a 57.7% aqueous solution of sodium thiocyanate, and enough water (3.35 kg.) to make a 40% solution, which is a concentration insufficient to dissolve the acrylonitrile polymerization product, are charged into a mixing kettle equipped with high speed agitation. The solution is agitated and a vacuum of 29 inches of mercury is applied for 5 minutes, after which the agitation is stopped. Ten minutes later the vacuum is released and 6.45 kg. of a moist crumb (66.2% solids) of an acrylonitrile polymerization product, more particularly, a copolymer of 95% acrylonitrile and 5% methyl acrylate, is added without agitation. Vacuum is reapplied and after 10 minutes the high speed agitation is started. After 2 minutes, 27.63 kg. of a 57.7% aqueous solution of sodium thiocyanate is added over a period of at least 3 minutes while the batch is being agitated under vacuum. The speed of agitation is reduced in 10 minutes, and agitation is then continued until all of the copolymer has dissolved, which usually takes place in about 50 minutes. The solution is then filtered and stored under vacuum until spun into fibers.

In a manner such as has been described hereinbefore with particular reference to the production of solutions of a polymerized vinyl compound, more particularly solutions of an acrylonitrile polymerization product (homopolymer or copolymer or interpolymer), in a concentrated aqueous solution of a water-soluble salt which yields highly hydrated ions in a aqueous solution, similar solutions can be formed of other polymerization products which are non-soluble in an aqueous or other solution of a compound at one concentration but are soluble in a solution of the same compound at a different concentration.

We claim:

1. The method of forming a solution of an acrylonitrile polymer comprised mainly of combined acrylonitrile, said method comprising dispersing said polymer in water containing a water-soluble salt which yields highly hydrated ions in an aqueous solution, the amount of the said salt which is present in the water being less than the critical concentration required in order to form a solution that will dissolve the said polymer; and adding to the resulting dispersion an additional amount of the same salt, the amount and concentration thereof being such that, after adding said salt to said dispersion, the concentration of said salt in the resulting mixture is above the critical concentration of salt required in order to dissolve the said polymer therein.

2. A method as in claim 1 wherein the acrylonitrile polymer is an acrylonitrile polymerization product containing an average of at least 85% by weight of combined acrylonitrile.

3. A method as in claim 2 wherein the acrylonitrile polymerization product is a copolymer of acrylonitrile containing an average of at least 85% by weight of combined acrylonitrile.

4. A method as in claim 3 wherein the copolymer of acrylonitrile is a copolymer of acrylonitrile and methyl acrylate.

5. A method as in claim 3 wherein the copolymer of acrylonitrile is a copolymer of acrylonitrile and allyl alcohol.

6. A method as in claim 1 wherein the acrylonitrile polymer is homopolymeric acrylonitrile.

7. A method as in claim 1 wherein the acrylonitrile polymer, prior to dispersing in the water containing the water-soluble salt, has associated therewith from 20 to 50%, by weight of the whole, of water.

8. A method as in claim 1 wherein the water-soluble salt is a water-soluble thiocyanate.

9. A method as in claim 8 wherein the water-soluble thiocyanate is sodium thiocyanate.

10. A method as in claim 8 wherein the water-soluble thiocyanate is calcium thiocyanate.

11. The method of forming a solution of an acrylonitrile polymerization product containing an average of at least 85% by weight of combined acrylonitrile, said method comprising dispersing said polymer in water containing a water-soluble thiocyanate, the amount of the said thiocyanate which is present in the water being less than the critical concentration required in order to form a solution that will dissolve the said polymerization product; adding to the resulting dispersion an aqueous solution of the same water-soluble thiocyanate, the amount of the said solution and the concentration of thiocyanate therein being such that, after adding said solution to said dispersion, the concentration of said thiocyanate in the resulting mixture is above the critical concentration of thiocyanate required in order to dissolve the said polymerization product therein; and agitating the said polymerization product in the thiocyanate solution thereby produced until it has dissolved therein.

12. A method as in claim 11 wherein the water-soluble thiocyanate is sodium thiocyanate.

13. In a method of forming a solution of an acrylonitrile polymer comprised mainly of combined acrylonitrile and wherein the polymer is dissolved, in the final solution, in a concentrated aqueous solution of a water-soluble salt which yields highly hydrated ions in an aqueous solution, the improvement which comprises adding said polymer to water containing said salt while the polymer, before being added thereto, has associated therewith from 20 to 50%, by weight of the whole, of water, the resulting aqueous liquid then containing a concentration of said salt which is above the critical concentration of salt required to dissolve the said polymer therein.

ARTHUR CRESSWELL.
PERCIVAL W. CUMMINGS, Jr.

REFERENCES CITED

The following references are of record in the file of this patent:

UNITED STATES PATENTS

| Number | Name | Date |
| --- | --- | --- |
| 2,140,921 | Rein | Dec. 20, 1938 |